A. N. Moore. Cultivator.

72880

PATENTED
DEC 31 1867

Witnesses.
Theo Tasche
Wm Trewin

Inventor:
A N Moore
per Munn & Co
Attorneys

United States Patent Office.

A. N. MOORE, OF NORTH COHOCTON, NEW YORK.

Letters Patent No. 72,880, dated December 31, 1867.

---

IMPROVEMENT IN PLOUGHS.

---

*The Schedule referred to in these Letters Patent and making part of the same.*

---

TO ALL WHOM IT MAY CONCERN:

Be it known that I, A. N. MOORE, of North Cohocton, in the county of Steuben, and State of New York, have invented new and useful Improvements in Ploughs; and I do hereby declare that the following is a full, clear, and exact description thereof, which will enable others skilled in the art to make and use the same, reference being had to the accompanying drawings, forming part of this specification.

Figure 1:
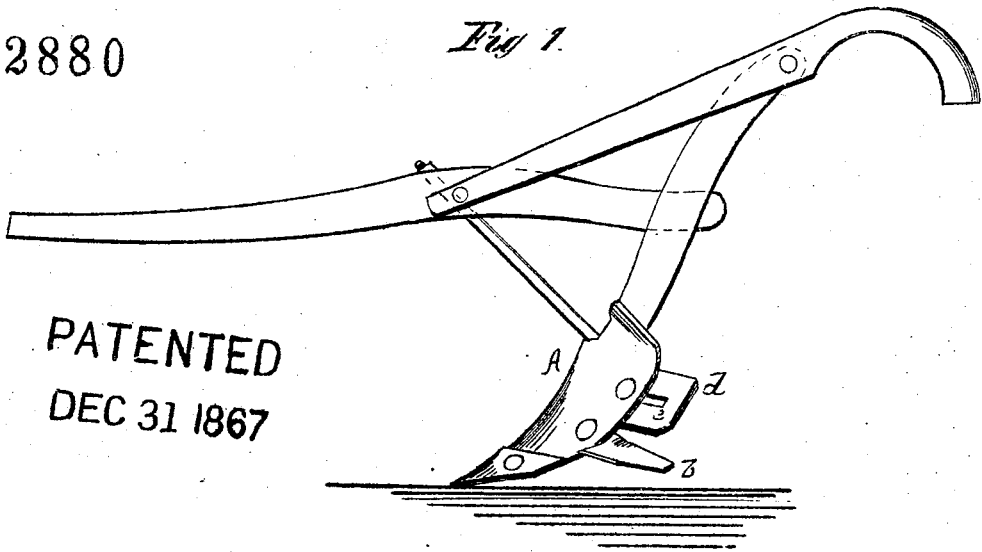
Figure 2:
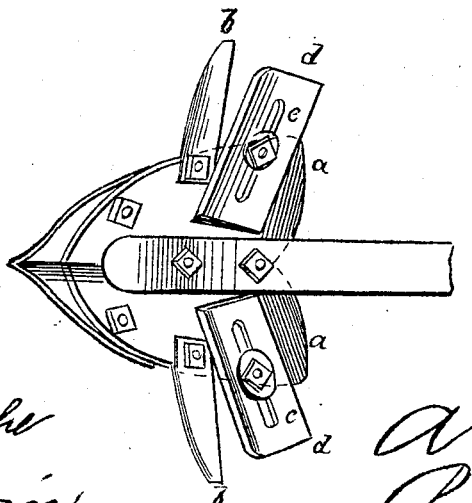

Figure 1 represents a perspective view of my improved plough.
Figure 2 is a detail back view of the same.
Similar letters of reference indicate corresponding parts.

This invention relates to the employment of ploughs for hilling corn or other cultivated growth, which is planted in rows, and which requires the soil ploughed or heaped upon its roots once or more during its cultivation.

It consists of cutting-knives or scrapers attached laterally to the ploughshare, at a short distance above the plough-point, together with lateral wooden wings and curved corners of the share, for the purpose of delivering off the soil more effectively, and hilling it up against the roots of corn or other vegetation.

In the drawings, A is the ploughshare, which is made with a V-shaped convexity, and also with the corners of the share bent forward, as shown at $a$ on the figures. $b\ b$ are the scrapers or knives, and are bolted to the share with countersunk bolts. These knives are slightly twisted, so as to bring their cutting-edges parallel with the ground. $d\ d$ are the wings, which are made of hickory or other hard wood, and are bolted to the share with countersunk bolts. The wings are attached to the share by means of one or more bolts through a longitudinal slot, $e$, which slot permits the adjustment of the said wings, as occasion may require. Both the knives and the wings are bolted to the share on its rear or under side. The bent corners are for the purpose of assisting the lateral delivery of the soil from off the plough, and for preventing the former from falling over and around the share back into the furrow, and conduces greatly to the perfect working of the plough. The wings are shortened or lengthened, as the roots of the growth to be hilled up are much extended or not.

I am aware that Paul Dennis, has obtained Letters Patent for a lateral attachment to ploughs, somewhat similar to mine, but his invention does not contemplate the preliminary scraping of the ground, nor is his device available for the purposes accomplished by my attachment. In his invention (see No. 55,630) the wings are mere vanes attached to the upper corners of the share, thus precluding the bent formation of the corners of the same, which is an important and indispensable adjustment, as without them the soil will not be so effectually delivered off laterally, but a portion will pass over behind the share.

The most effective location of the wings is at the point shown in the drawings, that is, midway between the corners $a$ and the scraper. When used for hilling hop or grape-vines, the scraper and wing of one side only are used, for the rows are generally too wide apart to admit of the successful performance of both, but when corn is the plant cultivated, both wings or both scrapers are to be used at the same time.

In the first instance the knife of one side only is put on, and the ground passed over, whereby the grass and stray vegetation will be cut up and eradicated. The wing is then attached, and the plough guided along one side of one row and returning along the next, thus requiring two furrows to each row. In cultivating corn, however, both sides can be used at once, as the rows are more approximated. Heretofore the common shovel-plough was ineffectually employed in hilling vegetation, as, from its shape, the soil falls back into the furrow to a great extent, and none of the soil is delivered far enough from the plough to satisfactorily accomplish the object desired, while close ploughing is impossible with some crops, as the injury of the roots would result; and in some cases the common shovel-plough was so ineffectual that the hilling of the crops was performed altogether by hand-hoes. My improvements enable the hilling of corn and other crops to be thoroughly and effectually accomplished, and thus supplies an agricultural implement much needed.

I claim as new, and desire to secure by Letters Patent—

1. The employment of scrapers $b$ and wings $d$, either separately or together, in combination with a plough, substantially as and for the purpose shown and described.

2. The slotted wing $d$, substantially as shown and described, in combination with a plough, for the purposes set forth.

3. The curved corners $a$ of a plough, substantially as shown and described, in combination with the wings $d$, for accomplishing the more perfect lateral delivery of the soil, all as set forth.

A. N. MOORE.

Witnesses:
ISAAC W. SECOR,
FRANK A. WETMORE.